May 24, 1938.　　　G. A. HUNTER　　　2,118,381
LUBRICATING APPARATUS
Filed Jan. 2, 1935
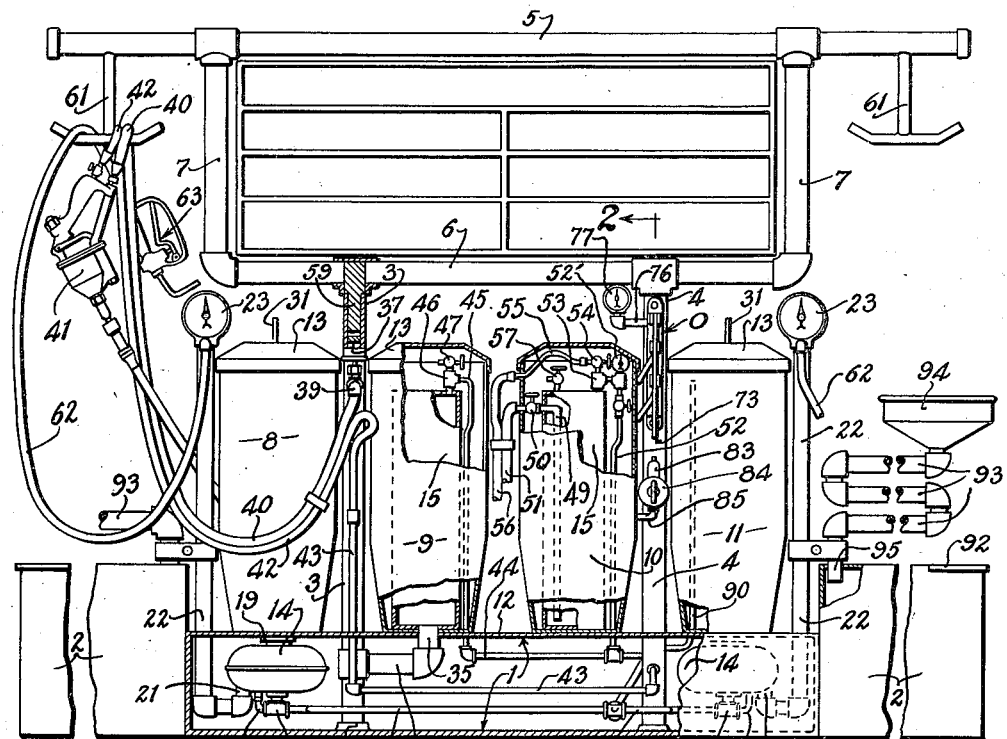
Fig. 1
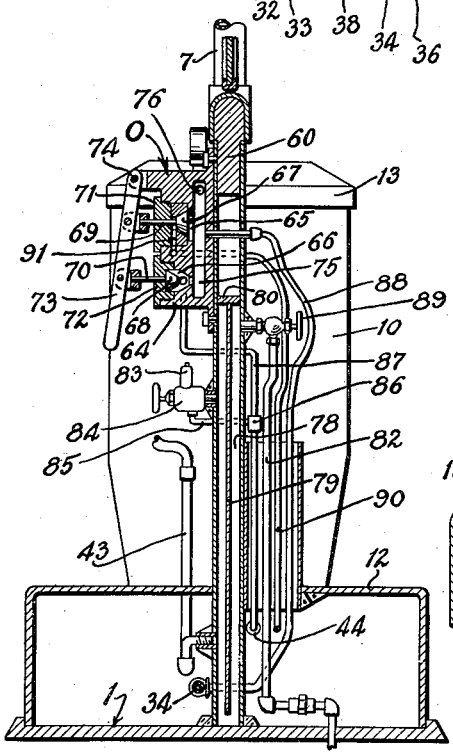
Fig. 2
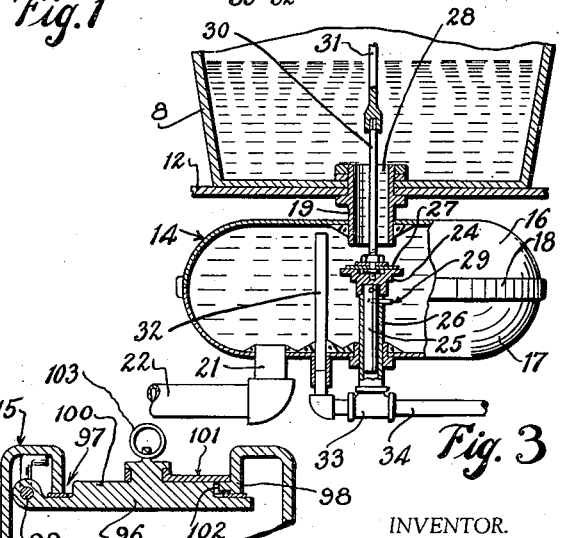
Fig. 3
Fig. 4
INVENTOR.
George A. Hunter
BY
ATTORNEY.

Patented May 24, 1938

2,118,381

UNITED STATES PATENT OFFICE 2,118,381

LUBRICATING APPARATUS

George A. Hunter, Los Angeles, Calif.

Application January 2, 1935, Serial No. 34

2 Claims. (Cl. 221—74)

This invention has for a main object the provision of a lubrication rack, or stand, of unitary character, including a base on which are mounted a plurality of receptacles of uniform size and character, a frame for supporting a rack consisting of one or more panels above said receptacles for supporting the necessary accessories for a lubricating outfit, and low and high pressure lubrication tanks associated with or housed within said receptacles and connected with a source of compressed air, whereby a comprehensive lubrication outfit is provided for the lubrication of all parts of motor vehicles and the like.

My invention comprehends the provision in a single unit of pleasing appearance of all of the necessary lubrication essentials whereby oil and grease may be supplied to a motor vehicle selectively from the receptacles mounted on the base, by means of "guns" or injection nozzles carried on the frame of the unit, including the collection and storing of the waste oil and grease drained from motor cars, and the metering of all oil and grease dispensed by the unit.

In the consideration of this invention reference is had to Letters Patent of the United States No. 1,969,404, granted to me on the 7th day of August, 1934, for Lubrication apparatus relative to which the present invention includes several major and minor improvements.

A more specific object of the present invention is to provide a lubrication apparatus with a base having a plurality of uniformly spaced and formed receptacles which are capable of holding quantities of grease and with which are associated high pressure dispensing tanks, either of small capacity and mounted below the receptacles, or of large capacity and mounted wholly within the receptacles, or below certain receptacles and within certain other receptacles in a single unit. Thus, the receptacles form storage tanks when the dispensing tanks are mounted therebelow and they form housings or casings for completely enclosing the larger tanks when the dispensing tanks are mounted within the receptacles, and in either case the receptacles are of uniform size and character so as to present an attractive appearance.

Another object is to provide compressed air means for connection with the dispensing tanks so as to render the several tanks selectively operative for dispensing the lubricant therefrom for application to different parts of a motor vehicle, together with means embodied in the apparatus for preventing an accumulation of moisture from the atmosphere in the air lines to the tanks, thereby eliminating moisture from the grease tanks.

My invention also contemplates the provision of one or more swivel drain pipes on the base which are movable into and from position beneath a motor vehicle for receiving the waste lubricants drained therefrom, and tanks embodied in the base of the unit for collecting the waste lubricants for further disposition.

A further object is to provide an improved type of high pressure dispensing tank and dispensing valve associated therewith for regulating the filling of the tank with grease and for sealing the tank during a dispensing operation. Still other objects will appear as the description progresses.

I have shown in the accompanying drawing a preferred form of apparatus embodying my said improvements, subject to modification within the scope of the appended claims without departing from the spirit of my invention.

In said drawing:

Fig. 1 is a front elevation of my improved apparatus, partly in section;

Fig. 2 is a sectional elevation of the same on line 2—2 of Fig. 1;

Fig. 3 is an enlarged fragmentary section of a high pressure dispensing tank associated with one or more of the grease receptacles and an improved type of valve for controlling communication between the dispensing tank and the receptacle; and Fig. 4 is a fragmentary section of a high pressure tank having an improved type of filling plug arranged at the top of the tank.

As generally arranged the preferred lubrication unit includes a base 1 formed of sheet metal either with or without internal reinforcement as may be found necessary, and having end extensions 2, 2, at least a pair of tubular standards 3 and 4 and a rectangular frame of tubular form composed of horizontal members 5 and 6 and vertical end members 7, 7. A plurality of receptacles 8, 9, 10 and 11, of uniform dimensions and character are mounted on the top 12 of base 1 at spaced positions and each receptacle has a removable top 13. The standard 3 is positioned between the receptacles 8 and 9 and the other standard 4 is positioned between the receptacles 10 and 11, for reasons which will hereinafter appear.

Said receptacles are all designed with a uniform capacity for holding a given quantity of grease or other lubricant adapted to be dispensed from a suitable nozzle by the application of pressure to a small dispensing tank 14, as shown in Fig. 1, associated with receptacles 8 and 11, or from a larger high pressure tank 15 wholly mounted within the receptacles, as shown, associated with receptacles 9 and 10. Thus, in cases where small quantities of a lubricant are dispensed at a single operation the smaller high pressure tanks 14 may be employed in association with one or more of the receptacles in connection with valve means within the dispensing tank for controlling the filling of the dispensing tank from the supply in the receptacle associated therewith and closing communication between the receptacle and tank during a dispensing operation.

On the other hand, when larger quantities of a lubricant are necessary for a lubrication operation, the larger tanks 15 are housed within one or more of the receptacles and the lubricant is stored in such tanks instead of in the receptacles, and the receptacles enclosing the tanks serve to house the tanks 15, so that from the exterior of the apparatus all of the receptacles are uniform and present a pleasing appearance.

Referring first to the dispensing tanks 14 and the associated receptacles 8 and 11, the tanks 14 are formed of a pair of mating sections 16 and 17 welded together in a diametrical plane to form a sealed joint 18, with a central inlet 19 at the top extending through and secured to the bottom 20 of receptacle 8 or 11, as the case may be. An outlet 21 is provided at the bottom of the tank 14 for connection with a dispensing pipe 22 leading to a meter 23 for measuring the volume of the lubricant dispensed from the tank.

The lower end of inlet 19 is adapted to be closed by means of a vertically slidable valve 24 attached to the upper end of a stem 25 which is slidable in a tube 26 secured to the bottom of the tank 14 and extended substantially upwardly into said tank. Valve 24 has a detachably supported gasket 27 on its upper face underlying and adapted to engage and seal the opening 28 in inlet 19. Preferably the tube 26 is permanently fixed to the bottom of tank 14 and stem 25 is prevented from rotation therein by means of a pin 29 extended through a peripheral slot in the tube. The gasket 27 may be held on the valve by means of a stem 30 having its lower end threaded into the valve and its upper end axially disposed in the opening 28 of inlet 19, as shown in Fig. 3. In order to remove and replace a gasket 27 conveniently after the valve is in position an extension 31 may be employed which is detachably connected at its lower end, as by means of a socket, with the upper end of stem 30. Said extension stem may project upwardly through the cover 13 of the receptacles associated with tanks 14.

Compressed air from a source is admitted to the interior of tank 14 at a point near the top of the tank by means of a pipe 32 which connects with a fitting 33 on an air supply pipe 34, one outlet of said fitting being attached to pipe 32 and a right angular outlet of the fitting being connected with tube 26. Thus, air is admitted to tank 14 simultaneously with the admission of air to the tube 26, for forcing the valve 24 upwardly into closing position against the bottom of inlet 19.

The high pressure tanks 15 which are mounted wholly within the receptacles, as at 9 and 10, may be differently arranged for different purposes. In some cases the outlet 35 for the lubricant may be formed at the bottom of the tanks 15 and connected by means of a pipe section 36 with one of the frame standards, as at 3, for instance, the upper and lower ends of said standard being closed by means of a plug, as at 37, at a point near the top and by means of a fitting 38 at the bottom. In such case the lubricant is dispensed from the standard 3 through an outlet valve 39 and a flexible hose 40 an injection nozzle 41 which is also supplied with air through another flexible hose 42 connected with an air supply pipe 43, as shown in Fig. 1.

Compressed air is admitted to the top of tank 15 by means of a pipe 44 having a branch 45 leading to a fitting 46 which has an outlet to the interior of the tank 15 in receptacle 9 and is also connected with a blow off valve 47 by means of which the air pressure in the tank may be relieved when the tank is to be refilled with a lubricant, upon the opening of a filling valve 96, of the type shown in Fig. 4.

Under certain conditions and for certain purposes of lubrication, the tank 15 within a receptacle as at 10, may be directly connected with a dispensing nozzle. In such case a pipe 49 is extended downwardly into the tank with its bottom end open at a point slightly above the bottom of the tank and its upper end bent at right angles and extended through the wall of the tank and connected with a shut off valve 50 internally of the receptacle 10 but having an outlet from said valve extended through the wall of the receptacle for connection with a flexible hose 51.

A branch 52 from air pipe 44 extends upwardly in receptacle 10 and externally of tank 15 to a point near the top of said tank and connects with an air gauge 52' and also with a fitting 53. Said fitting 53 has a connection with tank 15 and also with a shut off valve 54 which, in turn, is attached to a pipe 55 leading outwardly through the wall of receptacle 10 and connected with a flexible air hose 56. Thus compressed air and lubricant from tank 15 under pressure is dispensed from the receptacle 10 through hoses 51 and 56, respectively, to a suitable dispensing nozzle (not shown). A blow off valve 57 and a filling valve 96 are provided on the top of tank 15 in receptacle 10 for the same purpose as in receptacle 9.

It will be noted that the panelled frame of the unit is detachably supported on the standards 3 and 4, by providing extensions 59 and 60 on the lower horizontal member 6 of the frame which seat in the upper open ends of standards 3 and 4, respectively, and that the ends of member 5 are extended outwardly from the ends 7, 7 of the frame and carry depending supports 61, 61 for supporting the dispensing nozzles necessary to the operation of the unit.

The lubricant from receptacles 8 and 11 and the associated high pressure tanks 14 is dispensed from the meters 23 and flexible hoses 62 to and thence from a suitable dispensing nozzle 63.

The supply of compressed air to the various elements of the apparatus is regulated and controlled by a special operating unit 0 which, may be conveniently mounted on one of the standards of the frame, as at 4, thereby enabling me to employ the interior of the standard as an air chamber to which the air is admitted from a source and within which means is provided for ridding the air of moisture.

The operating unit 0 has a body 64 which is suitably attached to the standard 4 and is provided with two valve chambers 65 and 66 with oppositely operable valves 67 and 68, respectively mounted in the chambers. Said valves have stems 69 and 70, respectively, which are slidable in closures 71 and 72 for the chambers 65 and 66, respectively, and are pivotally connected with an operating handle 73 at their outer ends, as shown in Fig. 2, said handle being pivotally held on body 64 at 74. Body 64 also has a chamber 75 which communicates with both of the chambers 65 and 66 and has an outlet 76 leading to a pressure gauge 77.

Air is admitted to one side 78 of a chamber formed in the standard 4 and which has a central partition 79 therein fixed at its upper end to a plug 89 and having its lower end disposed slightly above the bottom of the chamber so that the inwardly flowing air will be directed downwardly in the chamber and around the bottom of said partition and thence upwardly in the other side of said chamber. Thus, the partition operates to collect the moisture resident in the air and the dry air will be moved upwardly on the opposite side of the partition and outwardly for use in the apparatus, as hereinafter described, while the moisture will gradually settle to the bottom of the chamber and may be disposed of at intervals in a suitable manner.

The compressed air from a suitable source is admitted by means of a pipe 82 to chamber 78 and a safety pop valve 83 is employed in connection with a pressure regulator 84 for maintaining a substantially uniform pressure in the apparatus and is provided with an outlet pipe 85 leading to a T connection with a pipe 87 which connects with pipe 44.

Pipe 87 leads to valve chamber 66 of unit 0 at a point inwardly of valve 68 so that when valve 68 is open, as shown, air will flow through chamber 66 into chamber 75 and thence outwardly through outlet 76 to pressure gauge 77 and also outwardly through a pipe 88 to a junction with pipe 34 which conducts air under pressure to tanks 14 of receptacles 8 and 11. Air flows both upwardly and downwardly from fitting 86 to supply chamber 66 and pipe 44, whereby air in the latter event is conducted to tanks 15 of receptacles 9 and 10.

Inlet pipe 82 has a valve 89 therein adjacent the connection with chamber 78 of standard 4 for regulating and cutting on or off the supply of air to said chamber. An exhaust pipe 90 leads from a passage 91 in body 64 outwardly of valve 65 upwardly into one of the receptacles (receptacle 11, as shown) and has its open end disposed at the top of the receptacle so that any grease or oil resident in the air may be exhausted in the receptacle at each operation of the unit 0.

Valve 66 controls the flow of air to the apparatus while valve 65 controls the exhaust of the waste air from unit 0. Hence, when valve 66 is open the valve 65 is closed, but upon the closing of valve 66 the valve 65 is simultaneously opened so that the pressure in chamber 75 and its connections will be relieved through pipe 90 into receptacle 11.

The waste oil tanks 2, 2 are of substantial capacity and may have closures 92, 92 at their tops through which the accumulated oil may be removed by suitable means. Each of the tanks 92 has a swinging drain pipe 93 formed of a plurality of swivelled sections and provided with a funnel 94 at the inlet and an outlet 95 depending into the tank 92 therebeneath. Said drains are commonplace and are adapted to be swung outwardly into positions beneath a car for collecting the oil as it is drained therefrom and nested when not in use over the tanks 92.

It will be understood, in the consideration of my improved apparatus, that ordinarily lubricating apparatus requires several units for the accomplishment of all of the lubricating operations incidental to the maintenance of motor vehicles, and that the apparatus herein shown and described is comprehensive in that all of the requirements of lubrication of motor vehicles may be met in a single unit with the elements thereof variously arranged and connected to meet local or particular conditions of use, without departing from a standard design of the unit.

For instance, in some cases injection nozzles, as at 41, are provided with both air and lubricating nozzles, in which event they may be connected in either of ways shown in Fig. 1 with the tanks 15, or otherwise for obtaining the most satisfactory results. In other cases the lubricant is dispensed through a nozzle, as at 63 connected with tank 14, or otherwise. In general the apparatus and its connections are elastic and readily adaptable to all purposes of lubrication from a standard unit of simple and pleasing design, low cost and durability.

A special type of filling plug is provided on the large high pressure tanks 15, as shown in Fig. 4, which has a disc 96 adapted to close an opening 97 in an inwardly turned neck 98. Said disc valve is internally hinged at 99 and has an extension 100 which projects into the neck 98 and carries a swivelled latch 101 axially held thereon and adapted to overlie a lug 102 formed on the wall of the neck so as to hold the valve in closed position.

Thus when air is released from the tanks 15 by opening valve 47, or 57, as the case may be, the valve 96 may be opened by turning the latch 101 so as to disengage lug 102, whereupon the valve will swing downwardly into the tank and permit the insertion of a quantity of lubricant through the opening 97. The valve may be closed by grasping a ring for finger piece 103 attached to the top of the valve and pulling the valve upwardly until it seats against the bottom of neck 98, whereupon the latch 101 may be locked and the air again supplied to the tank for further dispensing of the lubricant therefrom. When pressure is created in the tanks 15 the valve 96 is held firmly seated against the neck and provides a seal against the loss of pressure, as in the case of tanks 14.

What I claim, is:

1. A lubricating apparatus comprising: a base having a top wall thereon, a receptacle mounted on said top wall, a pressure tank on said base below said receptacle and provided with an inlet from said receptacle and an outlet, a cylinder extended vertically from the bottom of said tank and coaxial with said inlet, a plunger slidable in said cylinder, a valve on said plunger forming a closure for said inlet, and air supply means for said tank and for said cylinder, whereby air may be simultaneously supplied to said tank and cylinder for closing said valve and dispensing a lubricant from said outlet.

2. A lubricating apparatus comprising: a base having a top wall thereon, a receptacle mounted on said top wall, a pressure tank on said base below said receptacle and provided with an inlet from said receptacle and an outlet, a cylinder extended vertically from the bottom of said tank and coaxial with said inlet, a plunger slidable in said cylinder, a valve on said plunger forming a closure for said inlet, air supply means for said tank and for said cylinder, whereby air may be simultaneously supplied to said tank and cylinder for closing said valve and dispensing a lubricant from said outlet, said valve having a removable gasket thereon, and means extending through said inlet into said receptacle for removing said gasket at will.

GEORGE A. HUNTER.